United States Patent
Lee et al.

(10) Patent No.: US 9,966,616 B2
(45) Date of Patent: May 8, 2018

(54) APPARATUS AND METHOD FOR CONTROLLING PURGE VALVE OF FUEL CELL VEHICLE

(71) Applicant: Hyundai Motor Company, Seoul (KR)

(72) Inventors: Hyun Jae Lee, Seoul (KR); Hyo Seop Kim, Gyeonggi-do (KR); Yei Sik Jeon, Seoul (KR); Bu Kil Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 273 days.

(21) Appl. No.: 14/938,151

(22) Filed: Nov. 11, 2015

(65) Prior Publication Data

US 2016/0336607 A1    Nov. 17, 2016

(30) Foreign Application Priority Data

May 11, 2015 (KR) .................. 10-2015-0065432

(51) Int. Cl.
| | | |
|---|---|---|
| *H01M 8/04223* | (2016.01) | |
| *H01M 8/04302* | (2016.01) | |
| *H01M 8/0444* | (2016.01) | |
| *F02M 25/08* | (2006.01) | |
| *H01M 8/04225* | (2016.01) | |
| *H01M 8/0432* | (2016.01) | |
| *H01M 8/04746* | (2016.01) | |
| *H01M 8/04537* | (2016.01) | |
| *H01M 8/04303* | (2016.01) | |

(52) U.S. Cl.
CPC ..... *H01M 8/04231* (2013.01); *H01M 8/0432* (2013.01); *H01M 8/04225* (2016.02); *H01M 8/04302* (2016.02); *H01M 8/04303* (2016.02); *H01M 8/04335* (2013.01); *H01M 8/04358* (2013.01); *H01M 8/04447* (2013.01); *H01M 8/04589* (2013.01); *H01M 8/04753* (2013.01); *H01M 2250/20* (2013.01); *Y02T 90/32* (2013.01)

(58) Field of Classification Search
CPC combination set(s) only.
See application file for complete search history.

(56) References Cited

U.S. PATENT DOCUMENTS

| | | | |
|---|---|---|---|
| 2007/0026276 A1 | 2/2007 | Ogawa et al. | |
| 2010/0209793 A1* | 8/2010 | Kamiyama | H01M 8/04231 |
| | | | 429/429 |
| 2011/0014534 A1* | 1/2011 | Sung | H01M 8/04037 |
| | | | 429/429 |

(Continued)

FOREIGN PATENT DOCUMENTS

| | | |
|---|---|---|
| JP | 2007-035389 A | 2/2007 |
| JP | 2007-128778 A | 5/2007 |

(Continued)

*Primary Examiner* — Kaity Chandler
(74) *Attorney, Agent, or Firm* — Mintz Levin Cohn Ferris Glovsky and Popeo, P.C.; Peter F. Corless

(57) ABSTRACT

An apparatus and method for controlling a purge valve of a fuel cell vehicle are provided to reduce a consumption amount of hydrogen and improve fuel efficiency. In particular, whether oxygen concentration in a channel of an anode of a fuel cell stack exceeds a reference value is estimated while restarting the vehicle after the vehicle is parked. Then, an open time of a purge valve is adjusted based on a parking time of a vehicle when the hydrogen concentration is greater than the reference value.

20 Claims, 2 Drawing Sheets

(56) References Cited

U.S. PATENT DOCUMENTS

2013/0040219 A1* 2/2013 Naganuma ........ H01M 8/04014
 429/429
2013/0344410 A1* 12/2013 Son ................... H01M 8/04231
 429/429

FOREIGN PATENT DOCUMENTS

| JP | 2009-295505 A | 12/2009 |
| JP | 2014-003003 A | 1/2014 |
| KR | 10-2009-0043372 A | 5/2009 |
| KR | 10-1417290 B1 | 7/2014 |
| WO | 2008/056617 A1 | 5/2008 |

* cited by examiner

APPARATUS AND METHOD FOR CONTROLLING PURGE VALVE OF FUEL CELL VEHICLE

CROSS-REFERENCE TO RELATED APPLICATION

This application is based on and claims the benefit of priority to Korean Patent Application No. 10-2015-0065432, filed on May 11, 2015 in the Korean Intellectual Property Office, the disclosure of which is incorporated herein in its entirety by reference.

TECHNICAL FIELD

The present disclosure relates to an apparatus and method for controlling a purge valve of a fuel cell vehicle, and more particularly, to variably adjusting an opening time of purge valve based on a vehicle parking time when hydrogen concentration in an anode channel of a fuel cell stack exceeds a reference value while restarting the vehicle after the vehicle is parked (an ignition is tuned off).

BACKGROUND

In general, a fuel cell system includes a fuel cell stack that generates electric energy, a fuel supplier that supplies hydrogen, which is fuel, to the fuel cell stack, an air supplier that supplies air necessary for an electrochemical reaction to the fuel cell stack, a heat and water manager that removes reaction heat of the fuel cell stack to the exterior of the system, adjusts a driving temperature of the fuel cell stack, and executes a water managing function, and a controller that operates the fuel cell system. In particular, the fuel supplier includes a hydrogen tank, a high pressure/low pressure regulator, a hydrogen re-circulator, and the like, the air supplier includes an air blower, a humidifier, and the like, and the heat and water manager includes a coolant pump, a radiator, and the like.

Further, high pressure hydrogen supplied from the hydrogen tank of the fuel supplier is supplied to the fuel cell stack at low pressure through the high pressure and low pressure regulator, and the hydrogen re-circulator has a recirculation blower installed in a recirculation line to re-circulate non-reacted hydrogen left after the hydrogen is used in an anode of the stack into the anode, thereby prompting a reuse of the hydrogen. In the air supplier, dry air supplied by the air blower is humidified by performing a moisture exchange with exhaust gas (e.g., wet air) exhausted from an outlet of a cathode of the stack while passing through the humidifier and is then supplied to an inlet of the cathode of the fuel cell stack.

The stack of the fuel cell system includes an electricity generation assembly in which a plurality of unit cells are continuously arranged, and each of the unit cells is provided as a fuel cell of a unit configured to generate electric energy by the electrochemical reaction of hydrogen and air. The unit cells include a membrane-electrode assembly, and separators disposed adjacent to both sides of the membrane-electrode assembly. In particular, the separators are formed in a plate form having conductivity and each have channels formed to allow fuel and air to flow into a contact surface of the membrane-electrode assembly. In addition, the membrane-electrode assembly has the anode formed on one surface thereof, the cathode formed on the other surface thereof, and an electrolyte membrane formed between the anode and the cathode.

The anode performs an oxidation reaction for the fuel supplied through the channel of the separator to divide the fuel into electrons and hydrogen ions, and the electrolyte membrane moves the hydrogen ion to the cathode. In addition, the cathode performs a reduction reaction for electrons and hydrogen ions supplied from the anode, and oxygen in the air provided through the channel of the separator to generate water and heat.

A portion of the water generated in the cathode by a chemical reaction penetrates the electrolyte membrane and is moved to the anode. When the water moved to the anode remains in a catalyst layer, a reacting amount of catalyst is reduced. Additionally, when the water moved to the anode remains in the channel, a supply path of the hydrogen is blocked. Thus, the anode of the stack is further connected to a water trap that collects and discharges the water remaining in the catalyst layer or the channel, and a purge line that discharges impurities (e.g., including non-reacted hydrogen gas) in the anode to the humidifier.

The water trap is connected a drainage line that discharges the water to the humidifier, and the drainage line includes a drain valve opened every a purge period to discharge the water. In addition, the purge line includes a purge valve to discharge the impurities in the anode every the purge period. However, an apparatus for controlling a purge valve of a fuel cell vehicle according to the related art opens purge valve at a fixed open time, without considering hydrogen concentration in the channel of the anode of the fuel cell stack and the parking time while restarting the vehicle after the vehicle is parked. In other words, since the apparatus for controlling a purge valve of a fuel cell vehicle according to the related art unconditionally opens the purge valve during a fixed time while restarting the vehicle, a consumption amount of hydrogen increases, thereby decreasing fuel efficiency.

SUMMARY

The present disclosure ha provides an apparatus and method for controlling a purge valve of a fuel cell vehicle capable of reducing a consumption amount of hydrogen and improving fuel efficiency by estimating whether oxygen concentration in a channel of an anode of a fuel cell stack exceeds a reference value while restarting the vehicle after the vehicle is parked (e.g., an ignition is tuned off) and variably adjusting an open time of a purge valve based on a parking time of the vehicle when the hydrogen concentration exceeds the reference value. In the present disclosure, the parking time may indicate a total time in which the vehicle is parked. For example, when the vehicle is parked at 10:10 and then restarts at 10:20, the parking time is 10 minutes.

The object of the present disclosure is not limited to the above-mentioned object, and other objects and advantages of the present disclosure can be appreciated by the following description and will be clearly described by the exemplary embodiments of the present disclosure. In addition, it will be easily known that the objects and advantages of the present disclosure can be implemented by means shown in the appended claims and a combination thereof.

According to an exemplary embodiment of the present disclosure, an apparatus for controlling a purge valve of a fuel cell vehicle may include: a parking time measurer configured to measure a parking time of the vehicle; a temperature measurer configured to measure a temperature (hereinafter, referred to as a first temperature) of a fuel cell stack while turning off an ignition of the vehicle and a temperature (hereinafter, referred to as a second temperature) of the fuel cell stack while restarting the vehicle; an information obtainer configured to obtain an information value necessary to estimate whether hydrogen concentration in a channel of an anode of the fuel cell stack exceeds a reference value at a restarting timing of the vehicle; a purge valve driver configured to drive a purge valve; and a controller configured to operate the purge valve driver to open the purge valve during an open time that corresponds to the parking time measured by the parking time measurer, based on a table in which open times corresponding to parking times are stored, when the second temperature measured by the temperature measurer exceeds a first threshold and the information value obtained by the information obtainer exceeds the reference value.

According to another exemplary embodiment of the present disclosure, an apparatus for controlling a purge valve of a fuel cell vehicle may include: a parking time measurer configured to measure a parking time of the vehicle; a temperature measurer configured to measure a temperature (hereinafter, referred to as a first temperature) of a fuel cell stack while turning off an ignition of the vehicle and a temperature (hereinafter, referred to as a second temperature) of the fuel cell while restarting the vehicle; an information obtainer configured to obtain an information value necessary to estimate whether hydrogen concentration in a channel of an anode of the fuel cell stack exceeds a reference value at a restarting timing of the vehicle; a purge valve driver configured to drive a purge valve; and a controller configured to operate the purge valve driver to open the purge valve during an open time that corresponds to the parking time measured by the parking time measurer, based on a table in which open times corresponding to parking times are stored, when a value obtained by subtracting the second temperature from the first temperature is less than a threshold and the information value obtained by the information obtainer exceeds the reference value.

According to another exemplary embodiment of the present disclosure, a method for controlling a purge valve of a fuel cell vehicle may include: measuring a parking time of the vehicle; measuring a temperature (hereinafter, referred to as a first temperature) of a fuel cell stack while turning off an ignition of the vehicle and a temperature (hereinafter, referred to as a second temperature) of the fuel cell stack while restarting the vehicle; obtaining an information value necessary to estimate whether hydrogen concentration in a channel of an anode of the fuel cell stack exceeds a reference value at a restarting timing of the vehicle; and opening the purge valve during an open time that corresponds to the measured parking time based on a table in which open times corresponding to parking times are stored, when the second temperature measured by the temperature measurer exceeds a first threshold and the information value obtained by the information obtainer exceeds the reference value.

According to another exemplary embodiment of the present disclosure, a method for controlling a purge valve of a fuel cell vehicle may include: measuring a parking time of the vehicle; measuring a temperature (hereinafter, referred to as a first temperature) of a fuel cell stack while turning off an ignition of the vehicle and a temperature (hereinafter, referred to as a second temperature) of the fuel cell stack while restarting the vehicle; obtaining an information value necessary to estimate whether hydrogen concentration in a channel of an anode of the fuel cell stack exceeds a reference value at a restarting timing of the vehicle; and opening the purge valve during an open time that corresponds to the measured parking time measured based on a table in which open times corresponding to parking times are recorded, when a value obtained by subtracting the second temperature from the first temperature is less than a threshold and the information value exceeds the reference value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
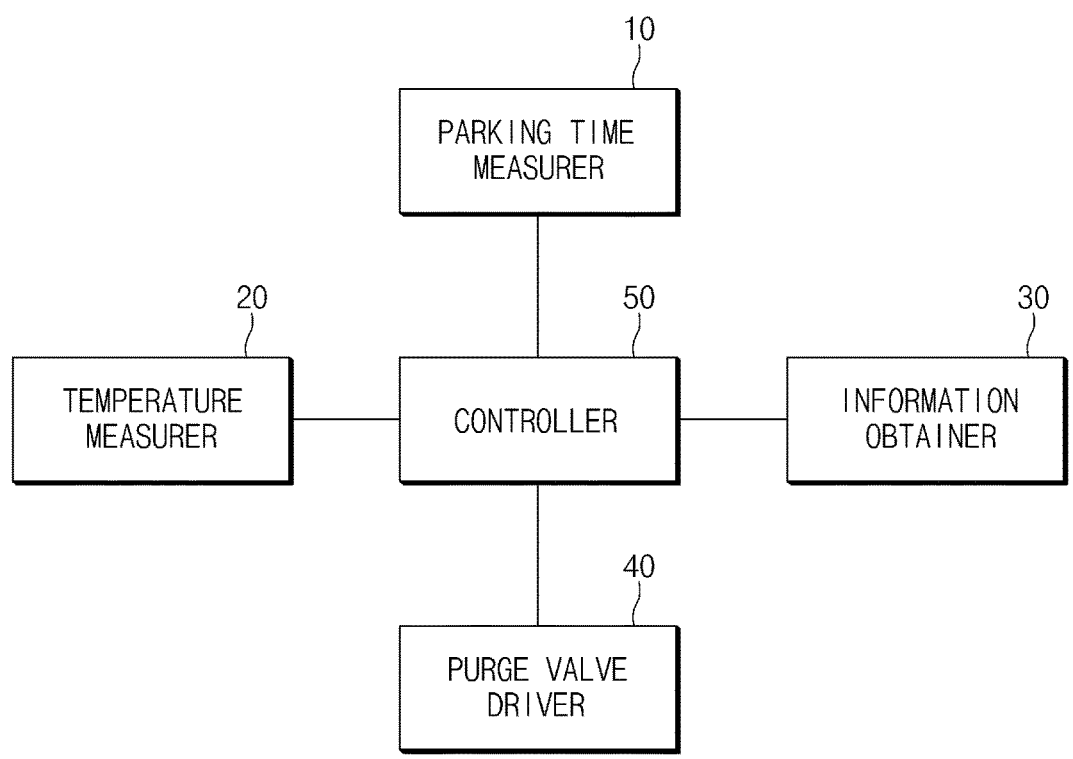
FIG. 1 is a diagram of an apparatus for controlling a purge valve of a fuel cell vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

The above-mentioned objects, features, and advantages will become obvious from the detailed description which is described below in detail with reference to the accompanying drawings. Therefore, those skilled in the art to which the present disclosure pertains may easily practice a technical idea of the present disclosure. Further, in describing the present disclosure, in the case in which it is determined that a detailed description of a well-known technology associated with the present disclosure may unnecessarily make the gist of the present disclosure unclear, it will be omitted. Hereinafter, exemplary embodiments of the present disclosure will be described in detail with reference to the accompanying drawings.

FIG. 1 is a diagram of an apparatus for controlling a purge valve of a fuel cell vehicle according to an exemplary embodiment of the present disclosure. As illustrated in FIG. 1, an apparatus for controlling a purge valve of a fuel cell vehicle according to the present disclosure may include a parking time measurer 10, a temperature measurer 20, an information obtainer 30, a purge valve driver 40, and a controller 50. The controller 50 may be configured to operate the other various components of the apparatus.

The respective components will be described below. First, the parking time measurer 10 may be configured to measure a total of time in which a vehicle is parked while restarting the vehicle after the vehicle is parked, as a parking time. In other words, the parking time measurer 10 may be configured to measure a time from an hour at which an ignition of the vehicle is turned off to an hour at which the ignition of the vehicle is turned on, as the parking time. For example, when the hour at which the ignition of the vehicle is turned off is 10:10, and then the hour at which the ignition of the vehicle is turned on is 10:20, the parking time is 10 minutes.

Further, the temperature measurer 20 may be configured to measure a first temperature of a fuel cell stack while turning off the ignition of the vehicle, and then measure a second temperature of the fuel cell stack while restarting the vehicle In particular, the temperature of the fuel cell stack may also be a temperature of a coolant of the fuel cell stack, and may also be a temperature of a cathode of the fuel cell stack.

The information obtainer 30 (e.g., a sensor) may be configured to collect and calculate information (e.g., numeric information) necessary to estimate whether hydrogen concentration in a channel of an anode of the fuel cell stack exceeds a reference value at a restarting timing of the vehicle, and the controller 50 may be configured to indirectly estimate whether the hydrogen concentration exceeds the reference values, based on information obtained by the following various exemplary embodiments.

The hydrogen concentration in the channel of the anode of the fuel cell stack may be difficult to measure directly since such a measurement requires an expensive hydrogen sensor which causes an increase in production cost of the vehicle. The estimation of whether the hydrogen concentration in the channel of the anode of the fuel cell stack exceeds the reference value at the restarting timing of the vehicle may determine whether the purge valve may be variably adjusted. In other words, when the hydrogen concentration in the channel of the anode of the fuel cell stack does not exceed (e.g., is less than) the reference value at the restarting timing of the vehicle, the purge valve may not be variably adjusted and a general purge logic may be used.

1) Accumulated Charge Amount

The information obtainer 30 may include a current meter configured to measure a current of the fuel cell stack, a charge amount calculator configured to calculate a charge amount by multiplying the current measured by the current meter by a time (e.g., a monitoring period), an accumulated charge amount calculator configured to calculate an accumulated charge amount by accumulating (e.g. summing) the charge amount calculated by the charge amount calculator, and a controller configured to operate the accumulated charge amount calculator to calculate the accumulated charge amount for a preset time. In particular, when the vehicle performs processes of "ignition, driving, and parking (ignition is turned off)" and then restarts, the preset time may also be a time from the ignition of the vehicle to the parking of the vehicle, and may also be a predetermined time before the parking of the vehicle (that is, a predetermined time before a parking hour).

2) Charge Amount Change Speed

The information obtainer 30 may include the current meter configured to measure the current of the fuel cell stack, the charge amount calculator configured to calculate the charge amount by multiplying the current measured by the current meter by the time (the monitoring period), the accumulated charge amount calculator configured to calculate the accumulated charge amount by accumulating the charge amount calculated by the charge amount calculator, a charge amount change speed calculator configured to calculate a charge amount change speed by dividing the accumulated charge amount calculated by the accumulated charge amount calculator by a preset time, and a controller configured to operate the accumulated charge amount calculator to calculate the accumulated charge amount for a predetermined time before the vehicle is parked and operate the charge amount change speed calculator to calculate the charge amount change speed by dividing the accumulated charge amount for the predetermined time before the vehicle is parked by the predetermined time.

3) Accumulated Purge Amount

The information obtainer 30 may include an accumulated purge amount detector configured to detect an accumulated purge amount for a preset time. Particularly, the purge amount may also mean hydrogen pressure, the number of purge times for the preset time (e.g., the number of open times of the purge valve), a purge time for the preset time (e.g., an open time of the purge valve), or a combination thereof. When the vehicle performs processes of "ignition, driving, and parking (ignition is turned off)" and then restarts, the preset time may also be a time from the ignition of the vehicle to the parking of the vehicle, and may also be a predetermined time before the parking of the vehicle (that is, a predetermined time before a parking hour).

4) Purge Amount Change Speed

The information obtainer 30 may include an accumulated purge amount detector configured to detect an accumulated purge amount for a preset time, a purge amount change speed calculator configured to calculate a purge amount change speed by dividing the accumulated purge amount detected by the accumulated purge amount detector by the preset time, and a controller configured to operate the accumulated purge amount detector to detect the accumulated purge amount for a predetermined time before the vehicle is parked and operate the purge amount change speed calculator to calculate the purge amount change speed by dividing the accumulated purge amount for the predetermined time before the vehicle is parked by the predetermined time.

Furthermore, the purge valve driver 40 may be configured to open or close the purge valve. The controller 50 may be configured to perform a general function to operate the functions of the respective components. Particularly, when a second temperature measured by the temperature measurer 20 is greater than a first threshold value and an information value obtained by the information obtainer 30 is greater than a reference value, the controller 50 may be configured to operate the purge valve driver 40 to open the purge valve during an open time that corresponds to the parking time measured by the parking time measurer 10, based on a table in which open times corresponding to parking times are recorded. When the information value obtained by the information obtainer 30 is less than the reference value, a general purge logic may be used.

In other words, when the second temperature measured by the temperature measurer 20 is greater than the first threshold value and the information value obtained by the information obtainer 30 is greater than the reference value, the controller 50 may be configured to determine that the hydrogen concentration in the channel of the anode of the fuel cell stack is greater than the reference value while restarting timing of the vehicle. In addition, even though the second temperature measured by the temperature measurer 20 may be less than the first threshold value, when a value obtained by subtracting the second temperature from the first temperature measured by the temperature measurer 20 is less than a second threshold value and the information value obtained by the information obtainer 30 is greater than a reference value, the controller 50 may be configured to operate the purge valve driver 40 to open the purge valve during the open time that corresponds to the parking time measured by the parking time measurer 10, based on a table in which the open times corresponding to the parking times are stored.

Particularly, when the value obtained by subtracting the second temperature from the first temperature measured by the temperature measurer 20 is the second threshold value or greater, the general purge logic may be used. Further, when the information value obtained by the information obtainer 30 is less than the reference value, the general purge logic may also be used. In other words, even though the second temperature measured by the temperature measurer 20 is less than the first threshold value, when the value obtained by subtracting the second temperature from the first temperature measured by the temperature measurer 20 is less than the second threshold value and the information value obtained by the information obtainer 30 is greater than the reference value, the controller 50 may be configured to determine that the hydrogen concentration in the channel of the anode of the fuel cell stack is greater than the reference value while restarting timing of the vehicle.

Meanwhile, the controller 50 may be configured to adjust the open times of the purge valve based on the following Table 1, by way of example.

TABLE 1

| | Parking Times | | | |
|---|---|---|---|---|
| | 3 minutes or less | 3 to 7 minutes | 7 to 10 minutes | 10 to 15 minutes |
| Target Hydrogen Concentration of 70% | 0 second | 0 second | 0.3 second | 0.5 second |
| Target Hydrogen Concentration of 75% | 0 second | 0.3 second | 0.7 second | 1 second |
| Target Hydrogen Concentration of 80% | 0 second | 1 second | 1 second | 1.2 second |

In particular, the target hydrogen concentration means the target hydrogen concentration during the restarting timing of the vehicle. When the open times of the purge valve are adjusted as illustrated in Table 1, there is a hydrogen reduction effect as follows.

When the parking time is 7 minutes, when the target hydrogen concentration is about 70%, hydrogen of about 0.4 g (4.86 liter) may be reduced.

When the parking time is 7 minutes, when the target hydrogen concentration is about 75%, hydrogen of about 0.28 g (3.4 liter) may be reduced.

According to the present disclosure, the apparatus for controlling a purge valve of a fuel cell vehicle may further include a memory configured to store the table in which the open times corresponding to the parking times may be recorded.

Figure 2:
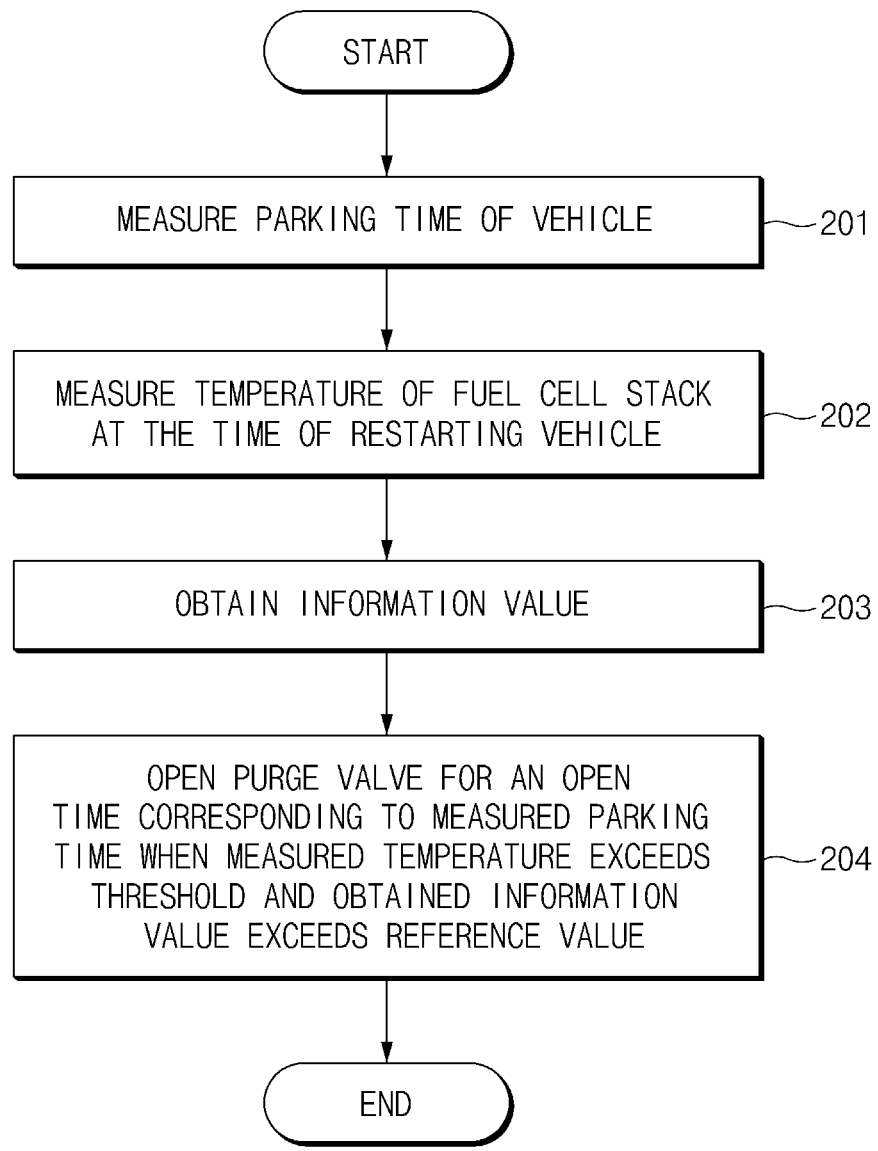
FIG. 2 is a flow chart of a method for controlling a purge valve of a fuel cell vehicle according to an exemplary embodiment of the present disclosure.

FIG. 2 is a flow chart of a method for controlling a purge valve of a fuel cell vehicle according to an exemplary embodiment of the present disclosure. First, the parking time measurer 10 may be configured to measure a parking time of a vehicle (201). In addition, the temperature measurer 20 may be configured to measure a first temperature of a fuel cell stack while turning off an ignition of the vehicle and a second temperature of the fuel cell stack while restarting the vehicle (202). The information obtainer 30 may be configured to obtain an information value necessary to estimate whether hydrogen concentration in a channel of an anode of the fuel cell stack exceeds a reference value at the restarting timing of the vehicle (203).

Further, when the second temperature measured by the temperature measurer 20 is greater than a first threshold value and the information value obtained by the information obtainer 30 is greater than a reference value, the controller 50 may be configured to open the purge valve during an open time that corresponds to the parking time measured by the parking time measurer 10, based on a table in which open times corresponding to parking times are recorded (204). In particular, even though the second temperature measured by the temperature measurer 20 is less than the first threshold, when a value obtained by subtracting the second temperature from the first temperature measured by the temperature measurer 20 is less than a second threshold and the obtained information value is greater than the reference value, the controller 50 may be configured to open the purge valve similarly to those described above.

Meanwhile, the method according to the present disclosure as described above may be created by a computer program. In addition, codes and code segments configuring the computer program may be easily deduced by computer programmers in the art. In addition, the created computer program is stored in a computer readable recording medium (information storage medium) and is read and executed by computers, thereby implementing the method according to the present disclosure. In addition, the recording medium includes all forms of computer readable recording medium.

As described above, according to the exemplary embodiments of the present disclosure, the consumption amount of hydrogen may be reduced and the fuel efficiency may be improved by estimating whether oxygen concentration in the channel of the anode of the fuel cell stack exceeds the reference value while restarting the vehicle after the vehicle is parked (e.g., an ignition is tuned off) and variably adjusting the open time of the purge valve based on the parking time of the vehicle when the hydrogen concentration exceeds the reference value.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a purge valve of a fuel cell vehicle, comprising:
    a parking time measurer configured to measure a parking time of the vehicle;
    a temperature measurer configured to measure a first temperature of a fuel cell stack while turning off an ignition of the vehicle and a second temperature of the fuel cell stack while restarting the vehicle;
    an information obtainer configured to obtain an information value necessary to estimate whether hydrogen concentration in a channel of an anode of the fuel cell stack is greater than a reference value at a restarting timing of the vehicle;
    a purge valve driver configured to drive a purge valve; and
    a controller configured to operate the purge valve driver to open the purge valve during an open time that corresponds to the measured parking time based on a table in which open times that correspond to parking times are recorded, when the second temperature measured by the temperature measurer is greater than a first threshold and the information value obtained by the information obtainer is greater than the reference value.

2. The apparatus according to claim 1, wherein when the second temperature measured by the temperature measurer is less than the first threshold, a value obtained by subtracting the second temperature from the first measured temperature is less than a second threshold and the information value obtained by the information obtainer is greater than the reference value, the controller may be configured to open the purge valve during an open time that corresponds to the measured parking time based on the table in which open times corresponding to parking times are recorded.

3. The apparatus according to claim 1, wherein the temperature measurer is configured to measure any one of a temperature of a coolant of the fuel cell stack and a temperature of a cathode of the fuel cell stack.

4. The apparatus according to claim 1, wherein the information obtainer includes:
    a current meter configured to measure a current of the fuel cell stack;
    a charge amount calculator configured to calculate a charge amount by multiplying the current measured by the current meter by a time; and
    an accumulated charge amount calculator configured to calculate an accumulated charge amount for a preset time by accumulating the charge amount calculated by the charge amount calculator.

5. The apparatus according to claim 1, wherein the information obtainer includes:
    a current meter configured to measure a current of the fuel cell stack;
    a charge amount calculator configured to calculate a charge amount by multiplying the current measured by the current meter by a time;
    an accumulated charge amount calculator configured to calculate an accumulated charge amount by accumulating the charge amount calculated by the charge amount calculator; and
    a charge amount change speed calculator configured to calculate a charge amount change speed by dividing the accumulated charge amount calculated by the accumulated charge amount calculator by a preset time,
    wherein the accumulated charge amount is calculated for a predetermined time before the vehicle is parked and the charge amount change speed is calculated by dividing the accumulated charge amount for the predetermined time before the vehicle is parked by the predetermined time.

6. The apparatus according to claim 1, wherein the information obtainer is configured to detect a purge amount accumulated for a preset time, and the purge amount is any one of hydrogen pressure, the number of purge times for the preset time, and a purge time for the preset time.

7. The apparatus according to claim 1, wherein the information obtainer is configured to detect a purge amount accumulated for a preset time, and the purge amount is a combination of one or more of hydrogen pressure, the number of purge times for the preset time, and a purge time for the preset time.

8. The apparatus according to claim 1, wherein the information obtainer includes:
    an accumulated purge amount calculator configured to detect a purge amount accumulated for a preset time; and
    a purge amount change speed calculator configured to calculate a purge amount change speed by dividing the accumulated purge amount detected by the accumulated purge amount detector by the preset time,
    wherein the accumulated purge amount is detected for a predetermined time before the vehicle is parked and the purge amount change speed is calculated by dividing the accumulated purge amount for the predetermined time before the vehicle is parked by the predetermined time.

9. The apparatus according to claim 1, further comprising:
    a memory configured to store the table in which the open times that correspond to the parking times are recorded.

10. An apparatus for controlling a purge valve of a fuel cell vehicle, comprising:
    a parking time measurer configured to measure a parking time of the vehicle;
    a temperature measurer configured to measure a first temperature of a fuel cell stack while turning off an ignition of the vehicle and a second temperature of the fuel cell stack while restarting the vehicle;
    an information obtainer configured to obtain an information value necessary to estimate whether hydrogen concentration in a channel of an anode of the fuel cell stack is greater than a reference value at a restarting timing of the vehicle;
    a purge valve driver configured to drive a purge valve; and
    a controller configured to operate the purge valve driver to open the purge valve during an open time that corresponds to the measured parking time based on a table in which open times corresponding to parking times are recorded, when a value obtained by subtracting the second temperature from the first temperature is less than a threshold and the information value obtained by the information obtainer is greater than the reference value.

11. A method for controlling a purge valve of a fuel cell vehicle, comprising:
    measuring, by a controller, a parking time of the vehicle;
    measuring, by the controller, a first temperature of a fuel cell stack while turning off an ignition of the vehicle and a second temperature of the fuel cell stack while restarting the vehicle;

obtaining, by the controller, an information value necessary to estimate whether hydrogen concentration in a channel of an anode of the fuel cell stack is greater than a reference value at a restarting timing of the vehicle; and opening, by the controller, the purge valve during an open time that corresponds to the measured parking time based on a table in which open times corresponding to parking times are recorded, when the second temperature measured by the temperature measurer is greater than a first threshold and the information value obtained by the information obtainer is greater than the reference value.

12. The method according to claim 11, wherein in the opening of the purge valve, the second temperature measured by the temperature measurer is less than the first threshold, when a value obtained by subtracting the second temperature from the first temperature measured by the temperature measurer is less than a second threshold and the information value obtained by the information obtainer is greater than the reference value, the purge valve is opened during an open time that corresponds to the measured parking time based on the basis of the table in which open times corresponding to parking times are recorded.

13. The method according to claim 11, wherein in the measuring of the temperature, any one of a temperature of a coolant of the fuel cell stack and a temperature of a cathode of the fuel cell stack is measured.

14. The method according to claim 11, wherein the obtaining of the information value includes:
    measuring, by the controller, a current of the fuel cell stack;
    calculating, by the controller, a charge amount by multiplying the current measured by the current meter by a time; and
    calculating, by the controller, an accumulated charge amount by accumulating the calculated charge amount for a preset time.

15. The method according to claim 11, wherein the obtaining of the information value includes:
    measuring, by the controller, a current of the fuel cell stack;
    calculating, by the controller, a charge amount by multiplying the measured current by a time;
    calculating, by the controller, an accumulated charge amount by accumulating the calculated charge amount for a predetermine time before the vehicle is parked; and
    calculating, by the controller, a charge amount change speed by dividing the calculated accumulated charge amount by the predetermined time.

16. The method according to claim 11, wherein in the obtaining of the information valve, a purge amount accumulated for a preset time is detected, and the purge amount is any one of hydrogen pressure, the number of purge times for the preset time, and a purge time for the preset time.

17. The method according to claim 11, wherein in the obtaining of the information valve, a purge amount accumulated for a preset time is detected, and the purge amount is a combination of one or more of hydrogen pressure, the number of purge times for the preset time, and a purge time for the preset time.

18. The method according to claim 11, wherein the obtaining of the information value includes:
    detecting, by the controller, a purge amount accumulated for a predetermined time before the vehicle is parked; and
    calculating, by the controller, a purge amount change speed by dividing the detected accumulated purge amount by the predetermined time.

19. The method according to claim 11, further comprising:
    storing, by the controller, the table in which the open times that corresponds to the parking times are recorded.

20. A method for controlling a purge valve of a fuel cell vehicle, comprising:
    measuring, by a controller, a parking time of the vehicle;
    measuring, by the controller, a first temperature of a fuel cell stack while turning off an ignition of the vehicle and a second temperature of the fuel cell stack while restarting the vehicle;
    obtaining, by the controller, an information value necessary to estimate whether hydrogen concentration in a channel of an anode of the fuel cell stack is greater than a reference value at a restarting timing of the vehicle; and
    opening, by the controller, the purge valve during an open time that corresponds to the measured parking time based on a table in which open times corresponding to parking times are recorded, when a value obtained by subtracting the second temperature from the first temperature is less than a threshold and the information value is greater than the reference value.

* * * * *